(12) United States Patent
Jorgensen et al.

(10) Patent No.: US 11,907,293 B2
(45) Date of Patent: Feb. 20, 2024

(54) REASONING FROM SURVEILLANCE VIDEO VIA COMPUTER VISION-BASED MULTI-OBJECT TRACKING AND SPATIOTEMPORAL PROXIMITY GRAPHS

(71) Applicant: CACI, Inc.—Federal, Arlington, VA (US)

(72) Inventors: Zachary Jorgensen, Aurora, CO (US); Tyler Staudinger, Denver, CO (US); Charles Viss, Denver, CO (US)

(73) Assignee: CACI, Inc.—Federal, Reston, VA (US)

( * ) Notice: Subject to any disclaimer, the term of this patent is extended or adjusted under 35 U.S.C. 154(b) by 245 days.

(21) Appl. No.: 17/120,349

(22) Filed: Dec. 14, 2020

(65) Prior Publication Data

US 2022/0188356 A1 Jun. 16, 2022

(51) Int. Cl.
| | |
|---|---|
| *G06F 16/787* | (2019.01) |
| *G06F 16/901* | (2019.01) |
| *G06F 40/56* | (2020.01) |
| *G06N 3/08* | (2023.01) |
| *G06F 16/75* | (2019.01) |
| *G06V 20/40* | (2022.01) |

(52) U.S. Cl.
CPC .......... *G06F 16/787* (2019.01); *G06F 16/75* (2019.01); *G06F 16/9024* (2019.01); *G06F 40/56* (2020.01); *G06N 3/08* (2013.01); *G06V 20/47* (2022.01)

(58) Field of Classification Search
None
See application file for complete search history.

(56) References Cited

U.S. PATENT DOCUMENTS

| | | | |
|---|---|---|---|
| 6,441,846 B1 * | 8/2002 | Carlbom | G06F 16/71 348/157 |
| 6,711,590 B1 * | 3/2004 | Lennon | G06F 16/7837 719/321 |
| 2005/0162423 A1 * | 7/2005 | Goggin | G06T 11/206 345/440 |
| 2015/0363644 A1 * | 12/2015 | Wnuk | G06F 16/285 382/103 |
| 2017/0039765 A1 * | 2/2017 | Zhou | G06T 7/521 |

FOREIGN PATENT DOCUMENTS

| | | | | |
|---|---|---|---|---|
| GB | 2493580 A | * | 2/2013 | G06F 16/24 |

\* cited by examiner

*Primary Examiner* — Robert W Beausoliel, Jr.
*Assistant Examiner* — Nirav K Khakhar
(74) *Attorney, Agent, or Firm* — BakerHostetler

(57) ABSTRACT

Methods, systems, and apparatuses, among other things, may detect and store activity in videos based on a spatiotemporal graph representation. Spatiotemporal proximity graphs may be built based on one or more received tracks and may include one or more nodes and each node may include one or more attributes associated with a corresponding entity. One or more spatiotemporal relationships may be identified between the entities based on each spatiotemporal proximity graph one or more activities of the entities may be identified based on the spatiotemporal relationships.

12 Claims, 6 Drawing Sheets

REASONING FROM SURVEILLANCE VIDEO VIA COMPUTER VISION-BASED MULTI-OBJECT TRACKING AND SPATIOTEMPORAL PROXIMITY GRAPHS

CROSS-REFERENCE TO RELATED APPLICATIONS

This disclosure relates to (i) U.S. provisional application 62/979,810 filed on Feb. 21, 2020 and entitled "Method and Apparatus for Object Detection and Prediction Employing Neural Networks," (ii) U.S. nonprovisional application Ser. No. 17/120,372 filed on Dec. 14, 2020 and entitled "Systems and Methods for Few Shot Object Detection," (iii) U.S. provisional application 62/979,824 filed on Feb. 21, 2020 and entitled "Machine Learning Method and Apparatus for Labeling Image Data," (iv) U.S. nonprovisional application Ser. No. 17/120,392 filed on Dec. 14, 2020 and entitled "Systems and Methods for Labeling Data," (v) U.S. Provisional Application No. 62/979,801 filed on Feb. 21, 2020 and entitled "Machine Learning Method and Apparatus for Detection and Continuous Feature Comparison," and (vi) U.S. nonprovisional application Ser. No. 17/120,356 filed on Dec. 14, 2020 and entitled "Machine Learning Method and Apparatus for Detection and Continuous Feature Comparison," the content of each of which is being incorporated by reference herein in its entirety.

FIELD

This application is generally related to methods and apparatuses for monitoring, summarizing, and searching surveillance video footage.

BACKGROUND

There are a number of different video storage solutions, each presenting a balance of transfer speed, balance, and capacity. Because each frame of video may contain a great deal of information (e.g., audio, visuals, timestamps, metadata, etc.), users must typically choose between speed and capacity, particularly when archiving video data. Accordingly, a need exists to improve the storage and retrieval of full motion video data in memory.

Analysis of manual full-motion is expensive and time consuming. Hours of video streams must be consumed by analysts. For example, raw video captured from surveillance platforms every year exceed an amount that can be realistically exploited by human analysts. Moreover, human analysts can easily miss important details due to fatigue and information overload. Consequently, important events may go unnoticed and strategic opportunities may be missed. Accordingly, there is a need to accurately and efficiently analyze video information in a way that can be efficiently stored and accessed (e.g., by downstream applications).

SUMMARY

The foregoing needs are met, to a great extent, by the disclosed apparatus, system and method for efficient activity detection in videos based on a spatiotemporal graph representation.

One aspect of the application is directed to a method of identifying spatiotemporal relationships between entities (e.g., people or objects) in a scene. In some embodiments, a scene may include one or more tracks, where each track may correspond to an entity. For example, the scene may be received from a database or an application. Moreover, scenes may be developed in real-time based on recorded or live-streamed video.

In some embodiments, one or more spatiotemporal proximity graphs may be built based on the received track(s). For example, a node may be identified for each entity and each spatiotemporal proximity graph may include one or more nodes. Moreover, each node may include one or more attributes associated with the corresponding entity, e.g., an attribute indicating a time interval in which the node was present in the scene or an attribute indicating a track identifier associated with the corresponding track. In some embodiments, the spatiotemporal proximity graph(s) may be transmitted to a downstream application.

In some embodiments, one or more spatiotemporal relationships may be identified between the entities. For example, one or more proximity edges may be identified based on each spatiotemporal proximity graph and each proximity edge may include an attribute indicating a span of frames in which one or more entities are within a defined spatial proximity (e.g., of each other or an object of interest). In some embodiments, one or more bounding boxes may be associated with each track and a defined spatial proximity may be based on an overlap of bounding boxes. In some embodiments, the spatiotemporal relationships may be transmitted to a downstream application.

In some embodiments, one or more activities of the entities may be identified based on the spatiotemporal relationships. Moreover, one or more complex activities may be identified based on one or more identified activities.

The above summary may present a simplified overview of some embodiments of the invention in order to provide a basic understanding of certain aspects of the invention discussed herein. The summary is not intended to provide an extensive overview of the invention, nor is it intended to identify any key or critical elements or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention. These drawings should not be construed as limiting the invention and are intended only to be illustrative.

DETAILED DESCRIPTION

Figure 1:
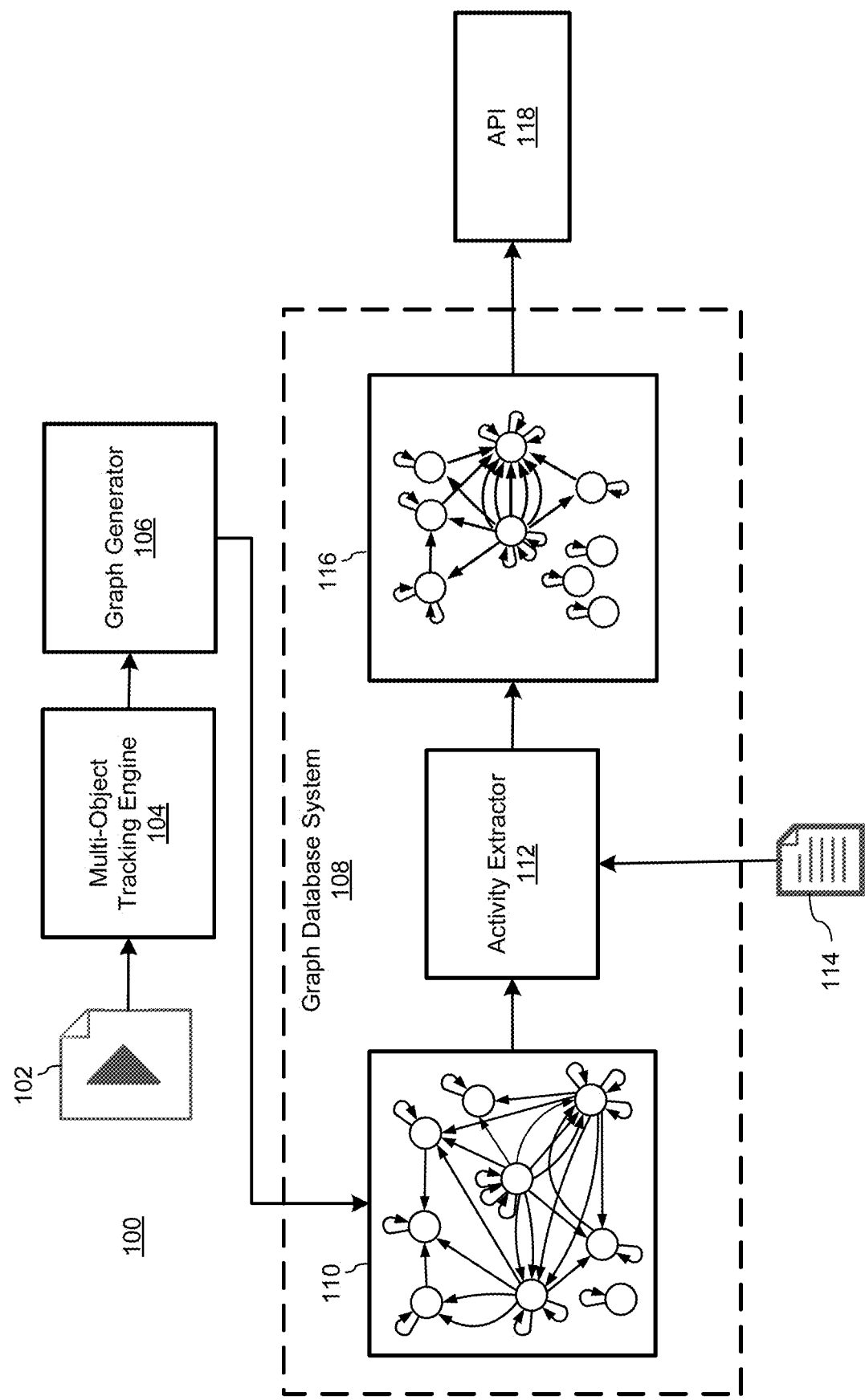
FIG. 1 is a schematic representation of an architecture of a system for activity detection in videos based on a spatiotemporal graph representation according to an aspect of the application.

In this respect, before explaining at least one embodiment of the invention in detail, it is to be understood that the invention is not limited in its application to the details of construction and to the arrangements of the components set forth in the following description or illustrated in the drawings. The invention is capable of embodiments or embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

It has been determined by the inventors and described herein that the application improves storage of video and activity detection in videos via machine learning techniques (e.g., artificial neural networks). Artificial neural networks (ANNs) are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections (weights) and acquires problem-solving capability as the strengths of the interconnections are adjusted, e.g., at least throughout training. The terms 'artificial neural network' and 'neural network' may be used interchangeably herein.

An ANN may be configured to detect an activity associated with an entity based on input image(s) or other sensed information. An ANN is a network or circuit of artificial neurons or nodes. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and may perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the front neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, hyperbolic tangent (Tan h), or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

Each of the herein-disclosed ANNs may be characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. And the hyperparameters are set before learning, and model parameters can be set through learning to specify the architecture of the ANN.

Learning rate and accuracy of each ANN may rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters. The hyperparameters may include initial values of weights and biases between nodes, mini-batch size, iteration number, learning rate, and so forth. Furthermore, the model parameters may include a weight between nodes, a bias between nodes, and so forth. In general, the ANN is first trained by experimentally setting hyperparameters to various values, and based on the results of training, the hyperparameters can be set to optimal values that provide a stable learning rate and accuracy.

According to some embodiments, FIG. 1 illustrates a schematic representation of an architecture of a system 100 for activity detection in videos (e.g., overhead surveillance video) based on a spatiotemporal graph representation according to an aspect of the application. Some embodiments employ machine learning for computer vision and automated reasoning. For example, the system 100 may receive object tracks from a computer vision-based multi-object tracker and uncover spatiotemporal relationships among tracked entities in video. According to some embodiments, the system 100 may infer high-level activities (e.g., entering/exiting a vehicle, people exchanging objects, loading/unloading objects from a vehicle/facility, etc.) from the structure of the spatiotemporal relationships. Moreover, the uncovered relationships and inferred activities may support intelligence applications like monitoring and alerting, semantic search, video summarization and anomaly detection. In some embodiments, a modular architecture may allow for integration of different detection and feature extraction methods into the system 100.

In an embodiment, the system 100 may receive one or more video frame(s) 102, e.g., archival footage or live video streams. In some embodiments, the video frame(s) 102 may be received via a wired or wireless network connection from a database (e.g., a server storing image data) or an imaging system. For example, an imaging system may include an aerial vehicle (e.g., a manned or unmanned aerial vehicle), a fixed camera (e.g., a security camera, inspection camera, traffic light camera, etc.), a portable device (e.g., mobile phone, head-mounted device, video camera, etc.), or any other form of electronic image capture device. Moreover, the system 100 may receive the one or more video frames 102 via a wired or wireless network connection.

According to some embodiments, video frames 102 may include ground based footage, aerial, or near-aerial footage. Moreover, other sensors such as LiDAR or radar, or a combination of cameras and other sensors may provide data. A multi-object tracking engine 104 may receive the one or more video frames 102, identify one or more objects, and perform tracking of the objects. Moreover, the multi-object tracking engine 104 may generate a track associated with each object. For example, a track generated by the multi-object tracking engine 104 may include a label or object identifier associated with an object. Moreover, a track associated with the object identifier may include a class identifier associated with the object of interest.

According to some embodiments, the multi-object tracking engine 104 may process a video by using computer vision to detect objects of interest and generates tracks for those objects, e.g., associating detections in multiple video frames to the same real-world entity. According to some embodiments, tracks generated by the multi-object tracking engine 104 may consist of a track identifier, a class label (e.g., vehicle, person), a sequence of bounding boxes representing the location of the tracked object in each frame of the video in which it was present, and/or a set of fine grain attribute predictions for each object (e.g., make, model, color for vehicle tracks or gender, clothing type and age range for personnel tracks).

According to some embodiments, a graph generator 106 may receive tracks generated by the multi-object tracking engine 104 and build one or more spatiotemporal proximity graphs (e.g., spatiotemporal proximity graph 110) based on the received tracks. For example, the graph generator 106 may use the tracks to automatically build a spatiotemporal proximity graph (e.g., spatiotemporal proximity graph 110) including one or more nodes. Moreover, each node may represent a distinct tracked entity (e.g., a specific truck) and the edges between nodes may represent a proximity relationship or a significant period of close spatial proximity between two entities. According to some embodiments, nodes may also have one or more "active" edges (e.g., self-loops) with attributes indicating a start and end time of each interval in which a corresponding entity was present in the scene.

According to some embodiments, both nodes and edges may contain attributes. For example, "proximity edges" may have attributes indicating a span of frames in which two entities were in close proximity and nodes may contain an attribute for a track identifier. Moreover, nodes and proximity edges may have additional attributes for any fine grain attribute predictions, which may be used for search refinement in some applications. According to some embodiments, track proximity may be computed in different ways, e.g., based on closeness or overlap of track bounding boxes in pixel-space. For example, a defined spatiotemporal proximity may be based on a threshold distance (e.g., in pixel space or coordinate space) between track bounding boxes. According to some embodiments, when necessary camera parameters are available, pixel coordinates may be translated to a coordinate frame (e.g., birds-eye view) and distances may be computed in that coordinate frame.

In some embodiments, system 100 may account for a change in viewpoint or perspective of the one or more video frames 102. For example, video footage from an aerial vehicle (e.g., plane, drone, etc.) may follow a flight trajectory resulting in a change in viewpoint of video recorded by the aerial vehicle. Accordingly, the graph generator 106 may account for a change in viewpoint by predicting a path or trajectory associated with the one or more video frames 102 and the spatiotemporal proximity graph 110 may be built based on the predicted path or trajectory (e.g., a flight path of an aerial vehicle).

According to some embodiments, the spatiotemporal proximity graphs (e.g., spatiotemporal proximity graph 110) generated by the graph generator 106 may be stored in graph database system 108. For example, the graph database system 108 may encompass storage of spatiotemporal proximity graphs (e.g., spatiotemporal proximity graph 110), an activity extractor 112, or storage of high-level activity graphs (e.g., high-level activity graph 116).

According to some embodiments, an activity extractor 112 may receive the spatiotemporal proximity graph 110 generated by the graph generator 106. Based on the spatiotemporal proximity graph 110, the activity extractor 112 may detect higher level activities through subgraph matching queries. For example, higher level activities detected by the activity extractor may include entering/exiting a vehicle or building, exchanging objects, etc.

According to some embodiments, the activity extractor 112 may receive ontology data 114 and may use the received ontology data 114 to generate a high-level activity graph (e.g., high-level activity graph 116). For example, ontology data 114 may include information such as class hierarchies (e.g., associated with spatiotemporal proximity graphs) or activity template queries to be used in identifying high-level activities.

According to some embodiments, the activity extractor 112 may generate a high-level activity graph (e.g., high-level activity graph 116). In some embodiments, detected activities may be represented in the high-level activity graph by "activity edges" between nodes participating in the activities. According to some embodiments, construction of the activity graph (e.g., an activity detection process), may be performed by the activity extractor 112 in an incremental manner. Moreover, some complex activities may be detected as a combination of previously added activity edges and underlying proximity edges. For example, the activity "loading an object into a vehicle" may be defined as an object entering a vehicle (e.g., represented as an "entered" activity edge between an object node and a vehicle node) and a proximity edge between a person and the object node with overlapping temporal attributes.

According to some embodiments, the activity extractor 112 may employ machine learning based classifiers (e.g., a three dimensional convolutional neural networks) to extract activities that are not otherwise detectable from the graph structure. For example, the activity extractor 112 may employ a machine learning classifier to partition a node's "active edge" into different unary activities for personnel nodes (e.g., walking, running, lying prone, and gesturing) or for vehicle nodes (e.g., turning left, turning right, making a U-turn, moving, or stationary). In some embodiments, the activity extractor may extract the cropped video sequence representing the interaction for proximity edges that are not otherwise part of a detected activity and classify it using machine learning. For example, proximity edges that are not otherwise part of a detected activity may be defined by the bounding boxes of the participating tracks and it may be determined that the proximity edge between two personnel nodes represents two individuals fighting, talking or shaking hands.

According to some embodiments, the system 100 may enable users to automatically summarize, a long, complex video as a compact spatiotemporal semantic graph that can be consumed by an analyst in minutes (e.g., instead of hours), Moreover, the spatiotemporal semantic graph may be searched over or exploited by a variety of other downstream applications. According to some embodiments, activity graphs may feed a wide-variety of applications (e.g., API 118), including summarization, exploration, alerting and monitoring, semantic search, anomaly detection, textual report generation and more.

Figure 2:
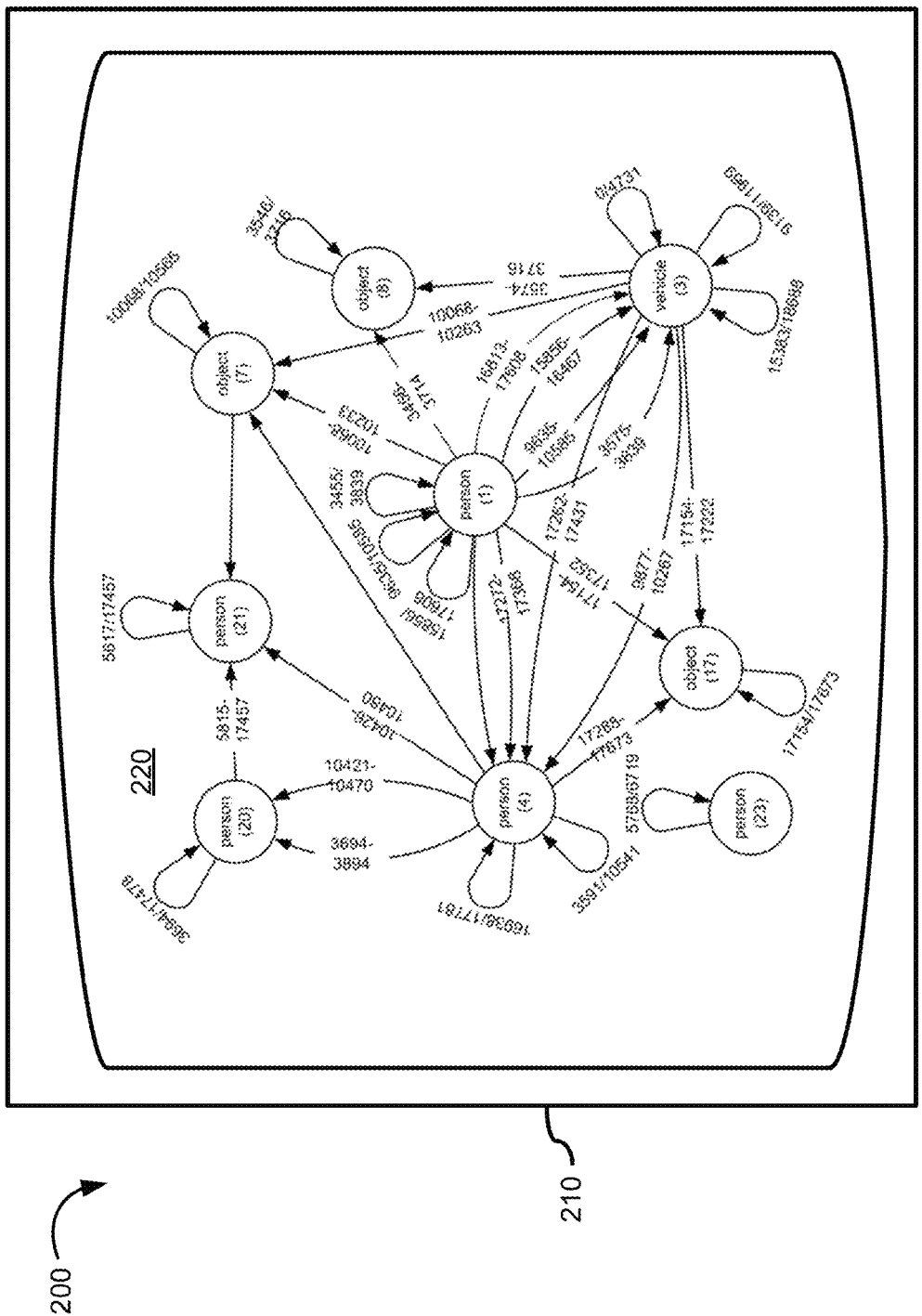
FIG. 2 is a diagram illustrating a graphic user interface of a spatiotemporal proximity graph on a computer monitor display according to an aspect of the application.

FIG. 2 is a diagram illustrating a physical environment 200 including a display 210. The display 210 may present (e.g., via a graphic user interface) a spatiotemporal proximity graph 220 according to an aspect of the application. According to some embodiments, spatiotemporal proximity graph 220 may be a directed, attributed multigraph. Moreover, spatiotemporal proximity graph 220 may include one or more nodes representing distinct tracked entities (e.g., a specific person, object, or vehicle). The edges between entities may represent a proximity relationship or a significant period of close spatial proximity that is expressed by an edge attribute as a range of contiguous frame numbers.

For example, as illustrated in FIG. 2, a spatiotemporal proximity graph 220 may be generated from video footage. Each entity may be represented by a node and each node may include one or more active edges (e.g., loops) that specify a range of frames that the node was active in the scene. Furthermore, each node may include one or more proximity edges (e.g., connections to other nodes) that specify a range of frames in which connected nodes are in close spatial proximity during the video.

In some embodiments, entities that come into close proximity during multiple distinct intervals in a video may share multiple proximity edges. Moreover, nodes may have one or more active edges (e.g., self-loops) that may represent intervals in which a track was active (e.g., visible in the scene). For example, a vehicle leaving a scene and then returning later may be captured by two active edges.

In some embodiments, tracks generated by the multi-object tracking engine may include sub-classifications or attributes including various fine gran properties of an entity corresponding to each track. Accordingly, generated nodes may also include attributes indicating various fine grain properties of one or more corresponding entities. For example, nodes may include make, model and color for vehicles, or sex, age range and clothing type for personnel. According to some embodiments, attributes associated with the nodes may allow for more precise querying and alerting by downstream applications.

According to some embodiments, proximity of one entity to another entity may be determined based on a closeness of track bounding boxes in a pixel space of a video. For example, close proximity in the pixel space of overhead video (e.g., drone, satellite, or flyover footage) or approximately overhead video (e.g., from elevated security cameras) may indicate true spatial proximity in a real-world environment.

According to some embodiments, two tracks may be considered to be in close proximity in a frame X if (1) the intersection-over-union (IoU) of their two bounding boxes is greater than a first threshold, or (2) the minimum distance between any pair of points on the edges of the bounding boxes is less than a second threshold.

According to some embodiments, determining whether the minimum distance between any pair of points on the edges of the bounding boxes is less than a threshold may capture proximity between objects (e.g., personnel) that may communicate or interact without being close enough for their boxes to overlap. Moreover, tracks may be required to be in close-proximity for a minimum number of frames (e.g., user-specified) in order for a proximity edge to be created in the graph. According to some embodiments, proximity intervals may contain brief gaps subject to a maximum number of frames (e.g., user-specified). Moreover, proximity intervals that are sufficiently close together may be merged.

Figure 3:
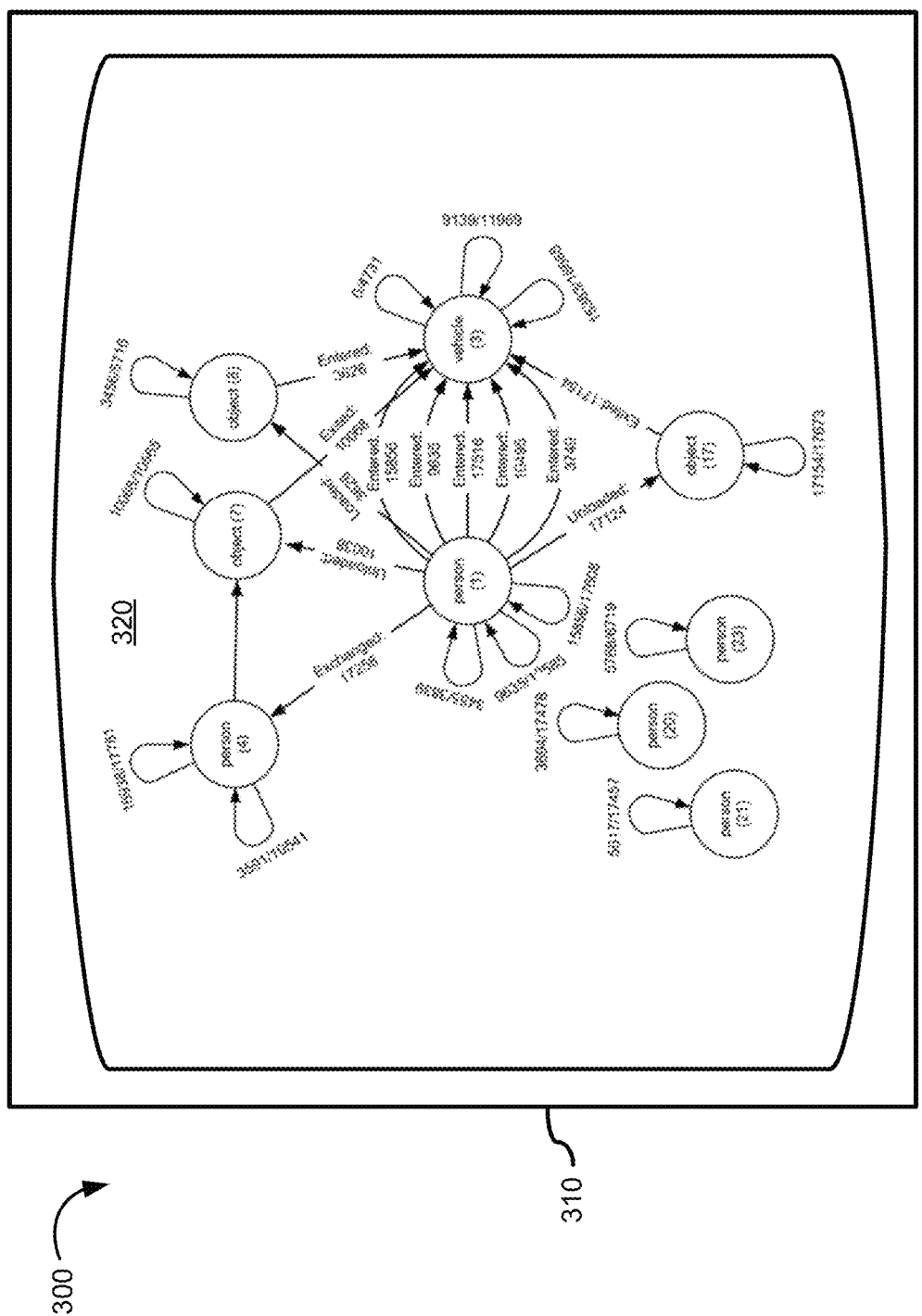
FIG. 3 is a diagram illustrating a graphic user interface of an activity graph on a computer monitor display according to an aspect of the application.

FIG. 3 is a diagram illustrating a physical environment 300 including a display 310. The display 310 may present (e.g., via a graphic user interface) an activity graph 320 according to an aspect of the application. According to some embodiments, the activity extractor 112 may perform sub-graph queries over one or more spatiotemporal proximity graphs (e.g., spatiotemporal proximity graph 220) to detect higher level activities. For example, the activity extractor 112 may detect activities including "entered" (e.g., a person or object entered a vehicle or building), "exited" (e.g., a person or object exited a vehicle or building), "loaded" (e.g., a person loaded an object into a vehicle or building), "unloaded" (e.g., a person unloaded an object from a vehicle or building), "exchanged" (e.g., a person exchanged an object with another person), "abandoned" (e.g., a person abandoned an object), "picked up" (e.g., a person picked up an (abandoned) object), etc.

According to some embodiments, activities may be detected using subgraph queries, e.g., provided to the system 100 in the form of activities templates expressed in a human-readable data-serialization language format (e.g., YAML). For example, new types of activities may be automatically detected by adding a new template to a configuration file (e.g., ontology data 114).

For example, an "entered activity" may be identified using the following query template:
type: Entered
ROLEA Entered ROLEB
participants:
ROLEA: person
ROLEB: vehicle
ROLEA: object
ROLEB: vehicle
template: "MATCH (p:ROLEA)-[ap:Active]->(p)-[x: Proximity]->(v:ROLEB)-[av:Active]->(v)
WHERE ap.end=x.end AND ay.start<x.start AND ay.end>x.end
AND NOT EXISTS {MATCH (p)-[ap2:Active]->(p) WHERE 120>ap2.start-x.end>0}
CREATE (p)-[r:Entered {start: x.end-90, end: x.end, bbox:x.bbox, duration: 90, desc: 'Entered:'+(x.end-90)}]->(v)
RETURN p, v, r"

In the above example of a query template for "entered activity," the query is specified in Cypher syntax (e.g., used by Neo4j graph database system). As further explanation of the above example, the query template for "entered activity" may be interpreted as follows: find all people or objects interacting with vehicles, where the person/object disappeared at the same time that their interaction with the vehicle ended, where the vehicle persisted beyond when the person/object disappeared (e.g., to account for camera movement), and where the person/object did not reappear in the next 120 frames (~4 seconds). Create an "Entered" edge between the person/object and the vehicle.

According to some embodiments, new activities may be defined in terms of previously defined activities. For example, a "loaded activity" (e.g., finds instances of people loading objects into vehicles) may be defined using the "entered" activity type:
type: Loaded
ROLEA Loaded ROLEB into ROLEC
participants:
—ROLEA: person
ROLEB: object
ROLEC: vehicle
template: "MATCH (p:ROLEA)-[pr:Proximity]->(o: ROLEB)-[en:Entered]->(v:ROLEC)
WHERE pr.start<en.start AND abs(pr.end-en.end)<25
CREATE (p)-[r:Loaded {start: en.start, end: en.end, bbox: en.bbox, duration: en.end-en.start, with: v.id, linked_edge: id(en), desc:'Loaded:'-+en.start}]->(o)
RETURN p, o, r"

Moreover, query templates for other activity types may be defined in a similar fashion. According to some embodiments, an object ontology tree may be defined that allows templates to refer to large classes of objects by a common ancestor node in the tree.

According to some embodiments, FIG. 3 shows an example of an activity graph 320 produced automatically from the spatiotemporal proximity graph 220 of FIG. 2. As shown in FIG. 3, the following observations can be made from activity graph 320:

Person 1 entered Vehicle 3 at frame 3749 and exited again at frame 9635. Person 1 subsequently entered and exited the same vehicle two more times during the video and the vehicle left the scene and returned each time.

Prior to entering Vehicle 3 the first time, Person 1 loaded Object 8 into the vehicle (at frame 3626).

Person 1 unloaded two more objects from the same vehicle over the course of the video: Object 7 was unloaded after the vehicle left and returned the first time and Object 17 after the second time. Person 1 was aided by person 4 in unloading Object 7 (at frame 10038).

Person 1 exchanged Object 17 with Person 4 (at frame 17258), after unloading it from Vehicle 3 (at frame 17124).

Persons 20, 21 and 23 were present on the scene as spectators, not involved in any high-level activities.

According to some embodiments, machine learning models may operate on video clips to detect other types of activities that are not evident from the graph structure or that cannot be easily expressed as a graph query. For example, there are certain types of unary activities (e.g., which can also be thought of as states) that cannot be detected from the graph. For example, these certain types of unary activities may include a person running, walking, lying prone, gesturing, etc. According to some embodiments, classifiers may be used to break active edges into subintervals based on detected states and machine learning models may be used to verify activities detected by the subgraph queries. For example, the tracking engine may make mistakes that lead to false activity detections in a graph. By passing an exact portion of a video identified by an activity edge into a corresponding video classification model, the problem of false activity detections may be reduced to one of classification as opposed to detection. For example, the problem of classification may be more tractable than end-to-end machine learning based activity detectors that operate on video.

Figure 4:
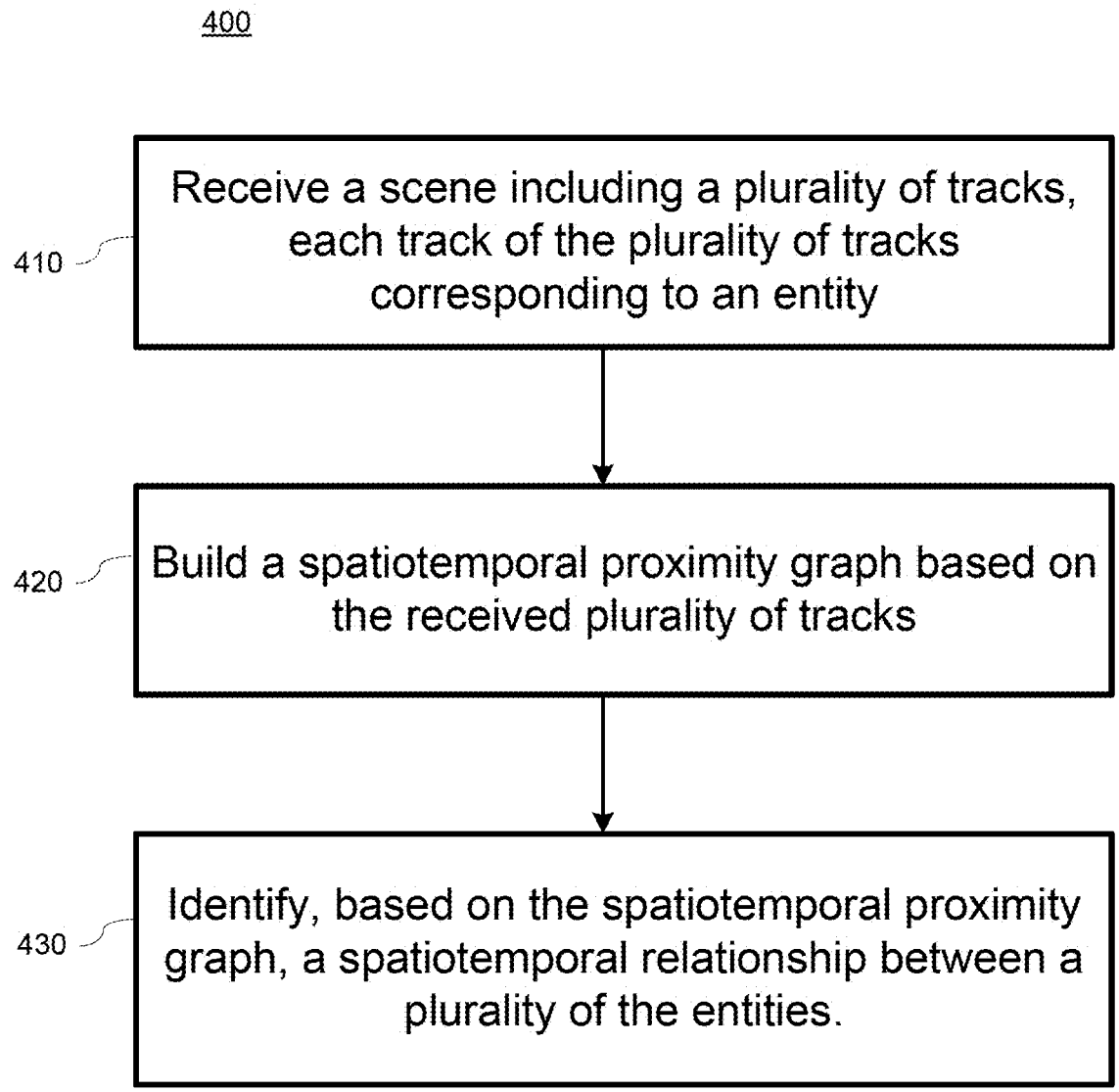
FIG. 4 illustrates an exemplary flowchart of a method 400 to detect activities in videos based on a spatiotemporal graph representation in accordance with the present disclosure.

FIG. 4 illustrates an exemplary flowchart of a method 400 to detect activities in videos based on a spatiotemporal graph representation. The method 400 may be performed at a network device, UE, desktop, laptop, mobile device, server device, or by multiple devices in communication with one another. In some examples, the method 400 is performed by processing logic, including hardware, firmware, software, or a combination thereof. In some examples, the method 400 is performed by a processor executing code stored in a computer-readable medium (e.g., memory).

As shown in method 400, at block 410, there may be receipt of a scene including a plurality of tracks and each track of the plurality of tracks may correspond to on entity (e.g., an object of interest). For example, the tracks may be received from a computer vision-based multi-object tracker. Moreover, each track may include a number of attributes (e.g., a label or an object identifier) associated with the track or the corresponding entity.

As shown in method 400, at block 420, a spatiotemporal proximity graph may be built based on the received plurality of tracks. In an embodiment, the spatiotemporal proximity graph may include one or more nodes, e.g., where each node represents a distinct tracked entity, and edges between nodes may represent a proximity relationship or a significant period of close spatial proximity between two entities. In some embodiments, nodes may have one or more "active" edges with attributes indicating a span of start and end time of each interval in which a corresponding entity was present in the scene. Moreover, nodes may include "proximity" edges with attributes indicating a span of frames in which two entities were in close proximity. For example, proximity (e.g., of tracks or entities) may be based on closeness or overlap of track bounding boxes in pixel-space.

As shown in method 400, at block 430, A spatiotemporal relationship between a plurality of the entities may be Identified based on the spatiotemporal proximity graph. According to some embodiments, method 400 may detect higher level activities by performing subgraph matching queries on one or more spatiotemporal proximity graphs. For example, one or more subgraph matching queries may be associated with an activity (e.g., entering or exiting a vehicle or building, exchanging objects, etc.).

According to some embodiments, an activity graph may be constructed based on the detected activities. For example, detected activities may be represented in the activity graph by "activity edges" between nodes participating in the activities. Moreover, some complex activities may be detected as a combination of previously added activity edges and underlying proximity edges.

According to some embodiments, activity graphs may be used by downstream applications to generate natural language reports summarizing a video feed. For example, generated natural language reports may be used by analysts to rapidly take note of key events or to determine whether analysts need to view the video. According to some embodiments, activity graph could also be used in a sematic search application to issue powerful queries over large numbers of videos. For example, a semantic search query could include "find an adult male and a child wearing a blue hat entering a red pickup truck".

According to some embodiments, alerting and monitoring may be seen as an extension of search. For example, alerts may be expressed as graph queries that run whenever a graph is generated or updated, e.g., triggering internal events or notifications. For example, an alert could be set to send a notification when objects are loaded or unloaded from a vehicle in a particular parking lot at a specific time of day. Moreover, pattern-of-life and anomaly detection may also be possible based on alerting and monitoring.

According to some embodiments, an interactive visualization tool may enable rapid exploration and understanding of a video based on its activity graph. For example, an analyst may be able to playback an original input video with various overlays and interactive features. According to some embodiments, as a video plays, all tracks may be drawn on top of the video as an overlay (e.g., including a track ID, class label and bounding box). Moreover, a user may select a displayed track and, based on the selection, see a list of all of the upcoming activities in which the selected track was involved. Furthermore, selecting an activity in the listing may advance the video playback to the specific frame in which that clicked activity begins. For example, whenever an activity occurs, an alert may pop up on the screen in the general area where the activity is occurring. According to some embodiments, keyboard shortcuts may allow a user to easily jump to next/previous activity, jump to a specific frame number, pause, fast forward or rewind playback.

According to some embodiments, an interactive web-based dashboard may render different views of an underlying activity graph or proximity graph (e.g., full graph, person-to-person proximity graph, activities only, a sub-graph surrounding a particular entity, etc.). For example, a user may select a specific frame of a video and see a snapshot of an activity graph or spatiotemporal proximity graph for that frame. Moreover, a dashboard may contain a side bar where a user may view an animated gif for each tracked entity in the video or filter the displayed animations by track ID or entity type.

Figure 5:
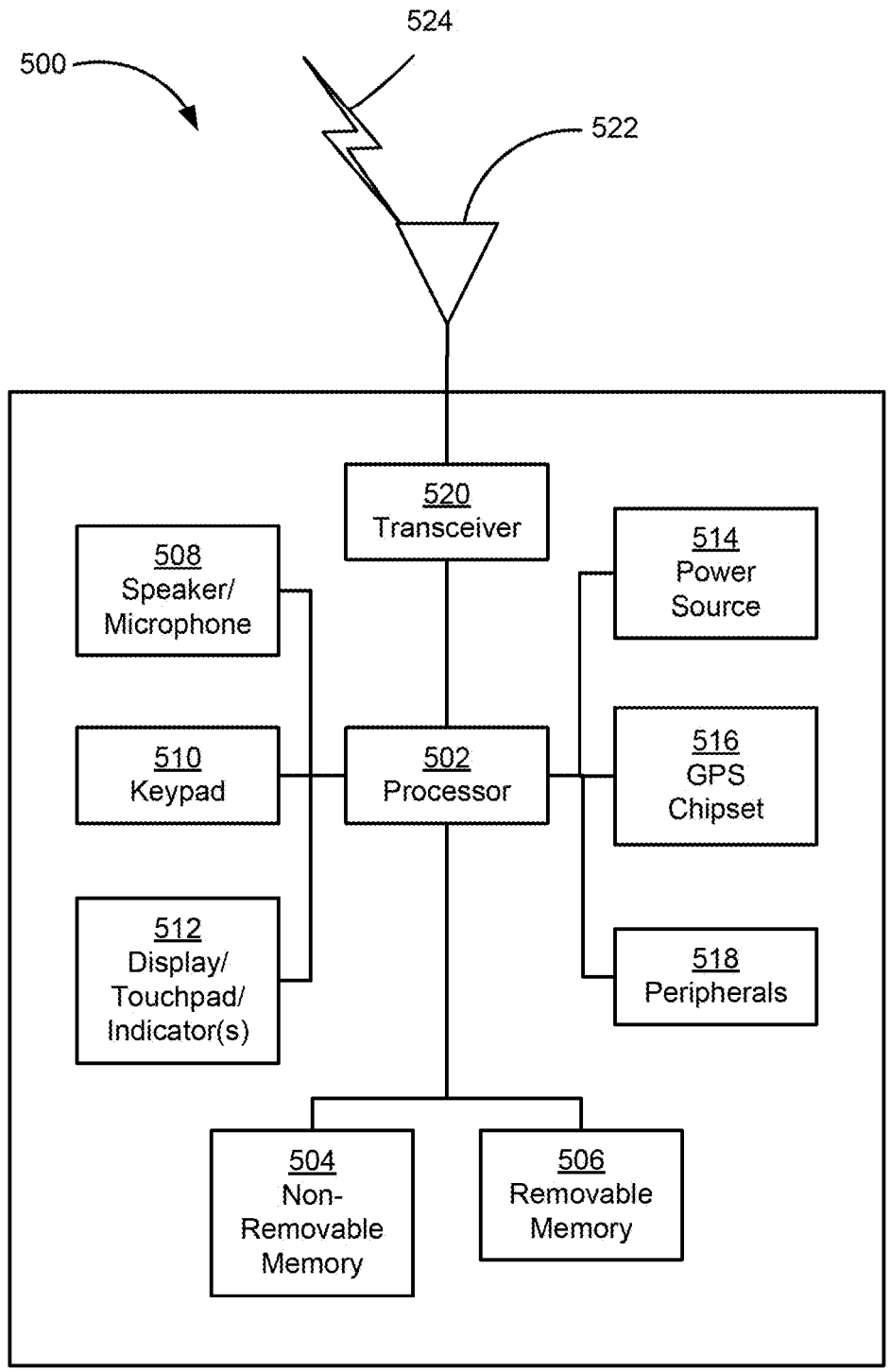
FIG. 5 illustrates a system diagram of an exemplary communication network node.

FIG. 5 is a block diagram of an exemplary hardware/software architecture of a node 500 of a network, such as clients, servers, or proxies, which may operate as an server, gateway, device, or other node in a network. The node 500 may include a processor 502, non-removable memory 504, removable memory 506, a speaker/microphone 508, a keypad 510, a display, touchpad, and/or indicators 512, a power source 514, a global positioning system (GPS) chipset 516, and other peripherals 518. The node 500 may also include communication circuitry, such as a transceiver 520 and a transmit/receive element 522 in communication with a communications network 524. The node 500 may include any sub-combination of the foregoing elements while remaining consistent with an embodiment.

The processor 502 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 502 may execute computer-executable instructions stored in the memory (e.g., memory 504 and/or memory 506) of the node 500 in order to perform the various required functions of the node 500. For example, the processor 502 may perform signal coding, data processing, power control, input/output processing, and/or any other functionality that enables the node 500 to operate in a wireless or wired environment. The processor 502 may run application-layer programs (e.g., browsers) and/or radio-access-layer (RAN) programs and/or other communications programs. The processor 502 may also perform security operations, such as authentication, security key agreement, and/or cryptographic operations. The security operations may be performed, for example, at the access layer and/or application layer.

As shown in FIG. 5, the processor 502 is coupled to its communication circuitry (e.g., transceiver 520 and transmit/receive element 522). The processor 502, through the execution of computer-executable instructions, may control the communication circuitry to cause the node 500 to communicate with other nodes via the network to which it is connected. While FIG. 5 depicts the processor 502 and the transceiver 520 as separate components, the processor 502 and the transceiver 520 may be integrated together in an electronic package or chip.

The transmit/receive element 522 may be configured to transmit signals to, or receive signals from, other nodes, including servers, gateways, wireless devices, and the like. For example, in an embodiment, the transmit/receive element 522 may be an antenna configured to transmit and/or receive RF signals. The transmit/receive element 522 may support various networks and air interfaces, such as WLAN, WPAN, cellular, and the like. In an embodiment, the transmit/receive element 522 may be an emitter/detector configured to transmit and/or receive IR, UV, or visible light signals, for example. In another embodiment, the transmit/receive element 522 may be configured to transmit and receive both RF and light signals. The transmit/receive element 522 may be configured to transmit and/or receive any combination of wireless or wired signals.

In addition, although the transmit/receive element 522 is depicted in FIG. 5 as a single element, the node 500 may include any number of transmit/receive elements 522. More specifically, the node 500 may employ multiple-input and multiple-output (MIMO) technology. Thus, in an embodiment, the node 500 may include two or more transmit/ receive elements 522 (e.g., multiple antennas) for transmitting and receiving wireless signals.

The transceiver 520 may be configured to modulate the signals to be transmitted by the transmit/receive element 522 and to demodulate the signals that are received by the transmit/receive element 522. As noted above, the node 500 may have multi-mode capabilities. Thus, the transceiver 520 may include multiple transceivers for enabling the node 500 to communicate via multiple RATs, such as Universal Terrestrial Radio Access (UTRA) and IEEE 802.11, for example.

The processor 502 may access information from, and store data in, any type of suitable memory, such as the non-removable memory 504 and/or the removable memory 506. For example, the processor 502 may store session context in its memory, as described above. The non-removable memory 504 may include random-access memory (RAM), read-only memory (ROM), a hard disk, or any other type of memory storage device. The removable memory 506 may include a subscriber identity module (SIM) card, a memory stick, a secure digital (SD) memory card, and the like. In other embodiments, the processor 502 may access information from, and store data in, memory that is not physically located on the node 500, such as on a server or a home computer.

The processor 502 may receive power from the power source 514 and may be configured to distribute and/or control the power to the other components in the node 500. The power source 514 may be any suitable device for powering the node 500. For example, the power source 514 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 502 may also be coupled to the GPS chipset 516, which is configured to provide location information (e.g., longitude and latitude) regarding the current location of the node 500. The node 500 may acquire location information by way of any suitable location-determination method while remaining consistent with an embodiment.

The processor 502 may further be coupled to other peripherals 518, which may include one or more software and/or hardware modules that provide additional features, functionality, and/or wired or wireless connectivity. For example, the peripherals 518 may include various sensors such as an accelerometer, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, an Internet browser, and the like.

The node 500 may be embodied in other apparatuses or devices, such as a sensor, consumer electronics, a wearable device such as a smart watch or smart clothing, a medical or eHealth device, a robot, industrial equipment, a drone, and a vehicle, such as a car, truck, train, or airplane. The node 500 may connect to other components, modules, or systems of such apparatuses or devices via one or more interconnect interfaces, such as an interconnect interface that may comprise one of the peripherals 518.

Figure 6:
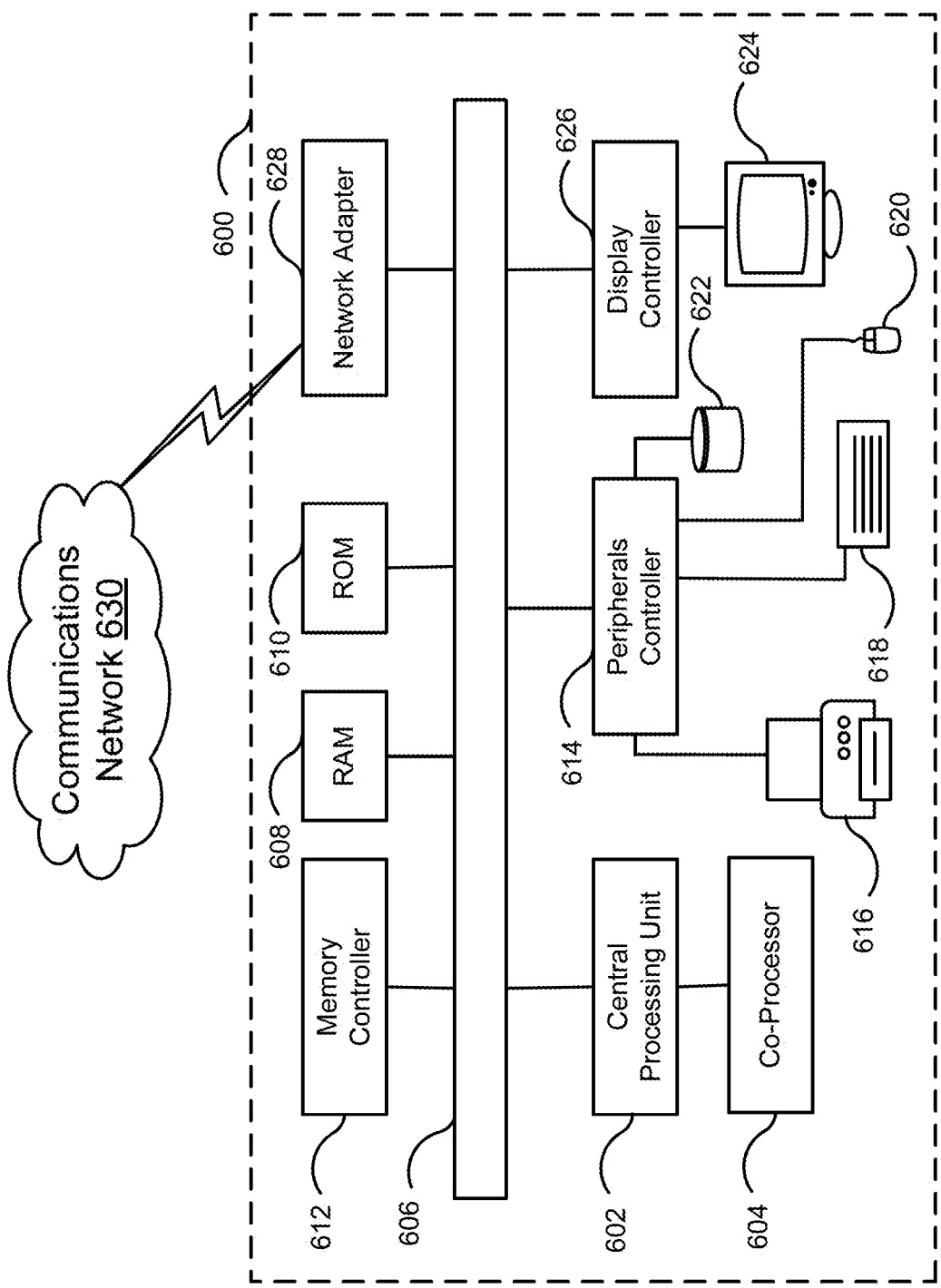
FIG. 6 illustrates a block diagram of an exemplary computing system.

FIG. 6 is a block diagram of an exemplary computing system 600 that may be used to implement one or more nodes (e.g., clients, servers, or proxies) of a network, and which may operate as a server, gateway, device, or other node in a network. For example, computing system 600 may include a network adapter 628 in communication with a communications network 630. The computing system 600 may comprise a computer or server and may be controlled primarily by computer-readable instructions, which may be in the form of software, by whatever means such software is stored or accessed. Such computer-readable instructions may be executed within a processor, such as a central processing unit (CPU) 602, to cause the computing system 600 to effectuate various operations. In many known workstations, servers, and personal computers, the CPU 602 is implemented by a single-chip CPU called a microprocessor. In other machines, the CPU 602 may comprise multiple processors. A co-processor 604 is an optional processor, distinct from the CPU 602 that performs additional functions or assists the CPU 602.

In operation, the CPU 602 fetches, decodes, executes instructions, and transfers information to and from other resources via the computer's main data-transfer path, a system bus 606. Such a system bus 606 connects the components in the computing system 600 and defines the medium for data exchange. The system bus 606 typically includes data lines for sending data, address lines for sending addresses, and control lines for sending interrupts and for operating the system bus 606. An example of such a system bus 606 is the PCI (Peripheral Component Interconnect) bus.

Memories coupled to the system bus 606 include RAM 608 and ROM 610. Such memories include circuitry that allows information to be stored and retrieved. The ROM 610 generally contains stored data that cannot easily be modified. Data stored in the RAM 608 may be read or changed by the CPU 602 or other hardware devices. Access to the RAM 608 and/or the ROM 610 may be controlled by a memory controller 612. The memory controller 612 may provide an address translation function that translates virtual addresses into physical addresses as instructions are executed. The memory controller 612 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 600 may contain a peripherals controller 614 responsible for communicating instructions from the CPU 602 to peripherals, such as a printer 616, a keyboard 618, a mouse 620, and a disk drive 622.

A display 624, which is controlled by a display controller 626, is used to display visual output generated by the computing system 600. Such visual output may include text, graphics, animated graphics, and video. The display 624 may be implemented with a CRT-based video display, an LCD-based flat-panel display, gas plasma-based flat-panel display, or a touch-panel. The display controller 626 includes electronic components required to generate a video signal that is sent to the display 624.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed:

1. A method comprising:
receiving a scene including a plurality of tracks, each track of the plurality of tracks corresponding to an entity and each track of the plurality of tracks being associated with a bounding box;
determining, based on a distance between a plurality of the bounding boxes, a defined spatial proximity between the plurality of the bounding boxes;
building a spatiotemporal proximity graph based on the plurality of tracks; and
identifying, based on the spatiotemporal proximity graph and the spatial proximity, a spatiotemporal relationship between a plurality of the entities.

2. The method of claim 1, further comprising identifying a node for each entity, wherein each node includes an attribute indicating a time interval in which the node was present in the scene and the spatiotemporal proximity graph includes the identified nodes.

3. The method of claim 2, wherein each node includes a second attribute indicating a track identifier associated with the corresponding track.

4. The method of claim 1, further comprising identifying one or more proximity edges, wherein each proximity edge includes an attribute indicating a span of frames in which two entities of the plurality of entities are within the defined spatiotemporal proximity.

5. The method of claim 1, wherein the defined spatiotemporal proximity is further based on a threshold distance between the bounding boxes for the tracks associated with the plurality of the entities.

6. The method of claim 1, further comprising identifying one or more activities of the plurality of entities based on the identified spatiotemporal relationship.

7. The method of claim 6, further comprising identifying one or more complex activities based on the identified one or more activities.

8. The method of claim 6, further comprising building an activity graph based on the identified one or more activities of the plurality of entities.

9. A computer program product comprising
a non-transitory computer-readable storage medium; and
instructions stored on the non-transitory computer-readable storage medium that, when executed by a processor, causes the processor to:
receive overhead video footage;
receive a scene associated with the overhead video footage including a plurality of tracks, each track of the plurality of tracks corresponding to an entity and each track of the plurality of tracks being associated with a bounding box;
build a spatiotemporal proximity graph based on the plurality of tracks;
identify, based on the spatiotemporal proximity graph and a distance between a plurality of the entities, a spatiotemporal relationship between the plurality of the entities; and
identify one or more portions of the overhead video footage that correspond to the spatiotemporal proximity graph.

10. The non-transitory computer program product of claim 9, wherein the instructions further cause the processer to identify a node for each entity, wherein each node includes an attribute indicating a time interval in which the node was present in the scene and the spatiotemporal proximity graph includes the identified nodes.

11. The non-transitory computer program product of claim 9, wherein the overhead video footage is received from an aerial vehicle.

12. The non-transitory computer program product of claim 9, wherein building the spatiotemporal proximity graph is based on a flight path of an aerial vehicle.

* * * * *